US005933303A

United States Patent [19]

Hahn

[11] Patent Number: 5,933,303

[45] Date of Patent: Aug. 3, 1999

[54] DEVICE FOR PROTECTION AGAINST OVERLOAD OF THE SWITCH CONTACTS OF A SWITCHING DEVICE

[75] Inventor: Michael Hahn, Berlin, Germany

[73] Assignee: Siemens Aktiengesellschaft, Munchen, Germany

[21] Appl. No.: 08/981,362

[22] PCT Filed: Jun. 5, 1996

[86] PCT No.: PCT/DE96/01048

§ 371 Date: Apr. 2, 1998

§ 102(e) Date: Apr. 2, 1998

[87] PCT Pub. No.: WO97/00531

PCT Pub. Date: Jan. 3, 1997

[30] Foreign Application Priority Data

Jun. 19, 1995 [DE] Germany .......................... 1 95 22 603

[51] Int. Cl.[6] ........................................................ H02H 3/00

[52] U.S. Cl. ................................ 361/2; 361/102; 335/201

[58] Field of Search .................................... 361/2–3, 5–6, 361/14, 93, 102, 42–43; 335/201

[56] References Cited

U.S. PATENT DOCUMENTS

| | | | |
|---|---|---|---|
| 5,185,684 | 2/1993 | Beihoff et al. | 361/45 |
| 5,185,685 | 2/1993 | Tennies et al. | 361/45 |
| 5,185,686 | 2/1993 | Hansen et al. | 361/45 |
| 5,185,687 | 2/1993 | Beihoff et al | 361/45 |

FOREIGN PATENT DOCUMENTS

| | | |
|---|---|---|
| 0 305 321 | 3/1989 | European Pat. Off. . |
| 0 384 552 | 8/1990 | European Pat. Off. . |
| 0 422 868 | 4/1991 | European Pat. Off. . |
| 0 455 564 | 11/1991 | European Pat. Off. . |
| 0 466 287 | 1/1992 | European Pat. Off. . |
| 34 33 126 | 3/1986 | Germany . |
| 39 05 822 | 8/1990 | Germany . |
| 40 22 078 | 1/1992 | Germany . |
| 43 16 239 | 11/1994 | Germany . |

*Primary Examiner*—Jeffrey Gaffin
*Assistant Examiner*—Michael J. Sherry
*Attorney, Agent, or Firm*—Kenyon & Kenyon

[57] ABSTRACT

A device for protection against overload of the switching contacts (22, 23) of a switching device (6) has an energy transducer (5) which is arranged near the switch contacts (22, 23) and is exposed to electromagnetic radiation emanating from an electric arc occurring at the switch contacts (22, 23). If the switch contacts (22, 23) are separated electrodynamically due to an overload, the energy transducer causes the circuit to be shut down by tripping solenoid (1) of a power circuit-breaker (6), for example.

9 Claims, 2 Drawing Sheets

DEVICE FOR PROTECTION AGAINST OVERLOAD OF THE SWITCH CONTACTS OF A SWITCHING DEVICE

FIELD OF THE INVENTION

The present invention concerns a device for protection against overload of the switch contacts of a switching device that has a switching mechanism for opening and closing the switch contacts, where the switch contacts can be separated under the influence of a high current against the action of the switching mechanism, forming an electric arc.

BACKGROUND INFORMATION

A protection device, for example, is described in German Patent No. 40 22 078 A1. A tripping shaft that belongs to the switching mechanism and can be activated by a release is provided as a component of the protection device. The release can in turn be influenced by the current flowing over the switching device. If the switch contacts are separated immediately by the forces associated with such a high current flow, the switching mechanism is released directly by the opening operation of the switch contacts, and thus a complete shutdown is brought about. The switching mechanism is released by a displaceable guidance of the tripping shaft against a restoring force with a reduction in coverage between the latching surfaces provided on a latch and on the tripping shaft.

Furthermore, it is known that the gas pressure that occurs when the switch contacts are opened in the arc quenching chamber of a switching device can be used for immediate actuation of the switching mechanism. Therefore, a pressure seal is provided for the switching mechanism and is connected to the arc quenching chamber by a pipeline (European Patent No. 455,561 A1).

Furthermore, it is possible to consider using methods which are known in another context for controlling a switching device and make it possible to detect a movement of a switch contact. This includes in particular an analysis device that measures the capacitance between the switch contacts and generates from it a signal for contact opening. Furthermore, a relative movement of a switch contact can be detected by a drive organ which is connected to the movable switch contact and is provided with a reflector, with an optical waveguide in a stationary mount opposite it a slight distance away. On the end facing away from the reflector, the optical waveguide acts together with a light source and a receiving circuit for reflected light. However, such devices as described in German Patent No. 39 05 822 A1 are relatively expensive supplementary devices of a switching device that need their own power supply and for whose electronic analysis circuits hardly any space is available in the casings of compact switching devices. On the other hand, the devices that operate mechanically according to the aforementioned German Patent No. 40 22 078 A1 and European Patent No. 455,564 A1 require a special structural adjustment to the desired operation with forced tripping when the switch contacts are raised.

Another restriction on the protection devices described above is that they can be used only in combination with switching devices having a switching mechanism that can be controlled by automatic devices. This condition is generally met with power circuit-breakers and contactors, but not with isolating switches.

SUMMARY OF THE INVENTION

An object of the present invention is to design a protection device against overload of the switch contacts of a switching device that has a switching mechanism for opening and closing the switch contacts, where the switch contacts can be separated under the influence of a high current against the action of the switching mechanism thereby forming an electric arc so that switching devices of various types can be protected from an excess current overload by an inexpensive device that can be added on easily.

According to the present invention, the aforementioned object is achieved by the fact that an electric energy transducer arranged in the vicinity of the switch contacts is exposed to electromagnetic radiation associated with the electric arc, and the energy transducer converts received electromagnetic radiation into a current for operation of the protection device. The present invention creates a means of always providing a small amount of electric energy whenever a switching device has reached its power limit, i.e., when the switch contacts are no longer capable of carrying the current flow continuously. The electric energy supplied by the energy transducer is then used to activate a suitable protection device which may be part of the switching device, but may also be accommodated elsewhere.

As part of the present invention, the energy transducer may have a coil with a ferrite core and a rectifier downstream from it. Such an arrangement acts as an antenna for the high-frequency radiation emitted by an electric arc and converted by the rectifier to a direct current suitable for actuation of the protection device. The ferrite core may be linear in shape or preferably toroidal. This design of the energy transducer is characterized by a special efficacy as well as the fact that a relatively large winding or multiple windings can be accommodated on the ferrite core.

As mentioned above, the invention is not limited to switching devices that have a switching mechanism controlled by a tripping element. In particular, when using a switching device designed as an isolating switch, the protection device may be assigned to a different protective device connected in series with the isolating switch and it may be controllable by the electric current supplied by the energy transducer. In switchgear where a power circuit-breaker that serves as an incoming feeder circuit-breaker and several isolating switches for outgoing circuits are mounted close together, such an arrangement does not pose any problems. The power circuit-breaker serves as the protective device that can be controlled by the energy transducer.

When using a switching device designed as a contactor with an electromagnetic drive, the protection device is to be allocated to a control circuit of the contactor. The contactor is then made to shut down when such a high current flows that the switch contacts are separated with arcing. If it is an ordinary contactor, i.e., unlatched, the control circuit of the electromagnetic drive may contain a normally closed contact that can be actuated by the energy transducer. However, if a latched contactor having a release magnet for shutdown is used as the switching device, the arrangement then resembles that in a power circuit-breaker where the release magnet of the contactor fulfils a function similar to that of the tripping solenoid of a power circuit-breaker.

Various designs that differ in their power demand are known for the tripping solenoids of power circuit-breakers. Tripping solenoids that are especially suitable for the purposes of this invention require relatively little auxiliary power, such as that which can be supplied by the energy transducer. A tripping solenoid having a permanent magnet to maintain the loaded condition of an energy storage mechanism and a tripping winding to release the energy storage mechanism. German Patent No. 34 33 126 A1 or European Patent No. 305,321 B1 describe suitable designs of tripping solenoids.

DETAILED DESCRIPTION OF THE INVENTION

Figure 1:
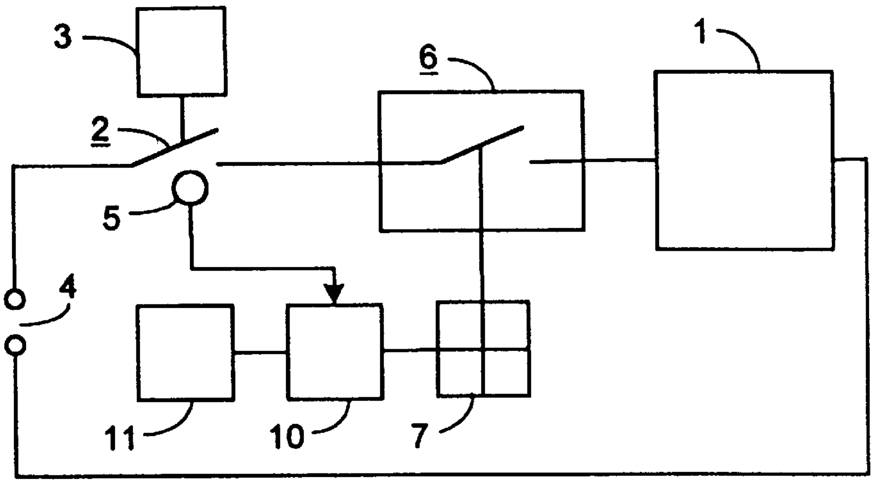
FIG. 1 shows a block diagram of an electric circuit with a consumer, an isolating switch, and a protective device in the form of a power circuit-breaker according to the present invention.

According to FIG. 1, an isolating switch 2 that is manually operated by a drive device 3 serves to turn a consumer 1 on and off. A protection device ensures that the switch contacts of isolating switch 2 are completely opened and thus the circuit supplied by a current source 4 is interrupted over consumer 1 when the switch contacts separate from each other under the influence of an excessive current against the action of drive device 3, forming an electric arc. The protection device includes a power circuit-breaker 6 that is also connected in series with current source 4 and consumer 1 and whose switching mechanism 7 can be released by a tripping solenoid 10 for opening the switch contacts. Tripping solenoid 10 is controlled by the current supplied by energy transducer 5. Moreover, tripping solenoid 10 can also be actuated by a tripping element 11 that supplies the normal protective functions set according to predetermined parameters.

Figure 2:
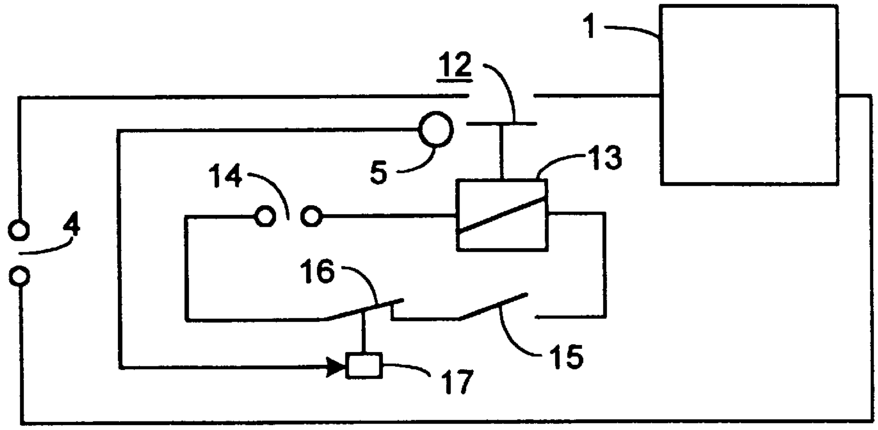
FIG. 2 shows another block diagram, where a consumer can be switched on and off by an electromagnetic contactor.

In the additional example according to FIG. 2, an electromagnetic contactor 12 is provided with a drive magnet 13 for turning consumer 1 on and off. An auxiliary current source 14 in combination with a control switch 15 serves to operate drive magnet 13. As in the example according to FIG. 1, the power limit of contactor 12 is detected by the fact that an energy transducer 5 is arranged near the switch contacts of contactor 12 which senses the radiant energy emitted by an electric arc at the switch contacts. In addition to energy transducer 5, the protection device in this embodiment includes a normally closed contact 16 which is in the control circuit of drive magnet 13 and whose actuating device 17 receives the current supplied by energy transducer 5.

Figure 3:
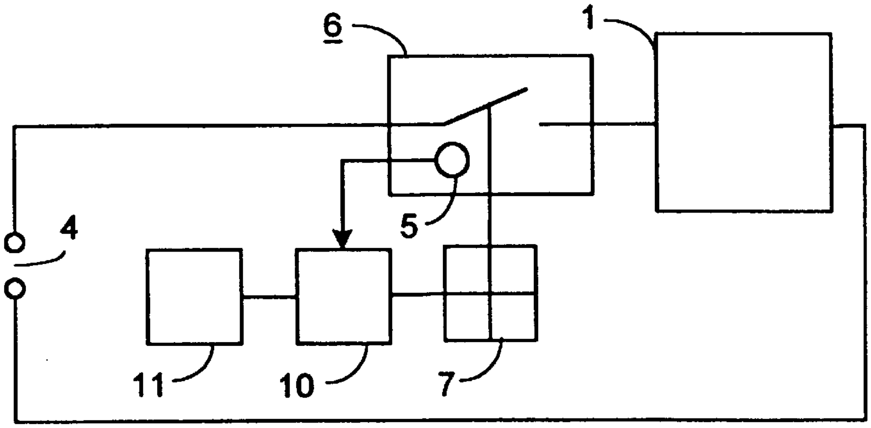
FIG. 3 shows a block diagram of circuit with a consumer and a power circuit-breaker according to the present invention.

FIG. 3 shows another example where only the power circuit-breaker (6) shown in FIG. 1 serves to switch consumer 1 on and off. Energy transducer 5 is provided for power circuit-breaker 6 and is also positioned close to the switch contacts to sense the electromagnetic radiation emitted by an electric arc at the switch contacts.

In all the examples described here, the circuits shown may be designed as single phase or polyphase. Accordingly, single-pole or multi-pole switching devices are used. With multi-pole switching devices, it is advisable to provide at least one energy transducer 5 for each pole.

Figure 4:
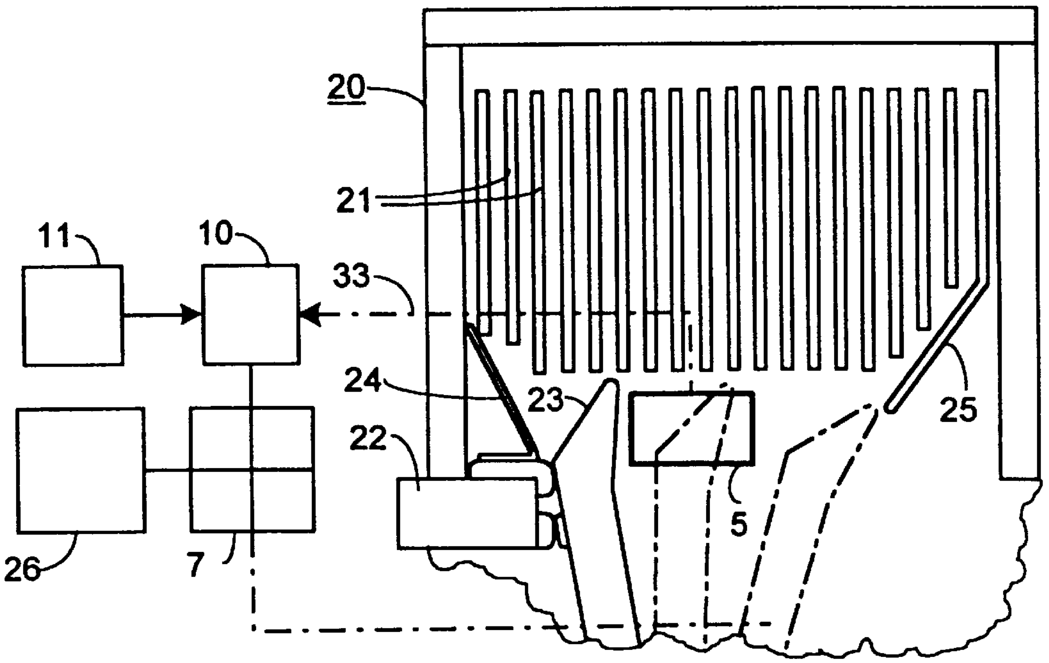
FIG. 4 shows an interrupter chamber of a low-voltage power circuit-breaker in combination with an energy transducer according to the present invention and a switching mechanism that can be released by a tripping solenoid.
Figure 5:
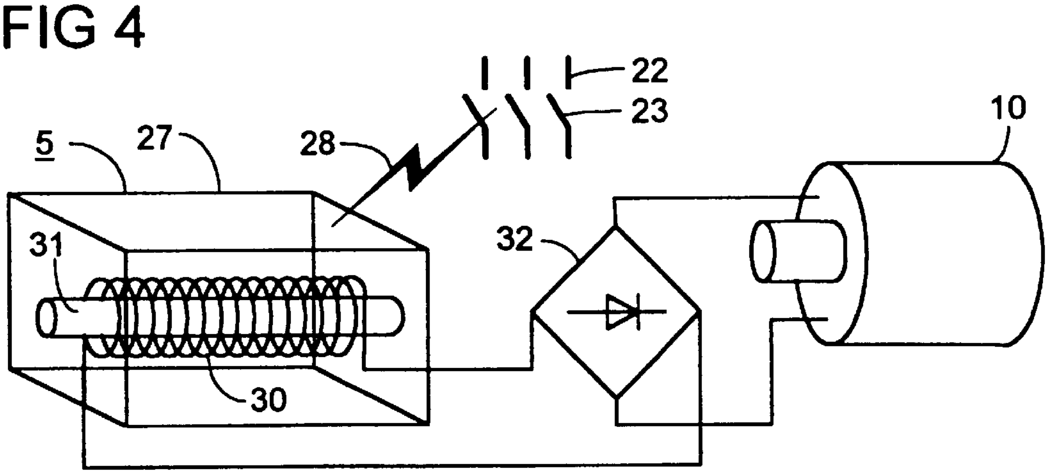
FIG. 5 shows an example of a circuit for an energy transducer and a tripping solenoid, where a ferrite core of the energy transducer has a straight shape.
Figure 6:
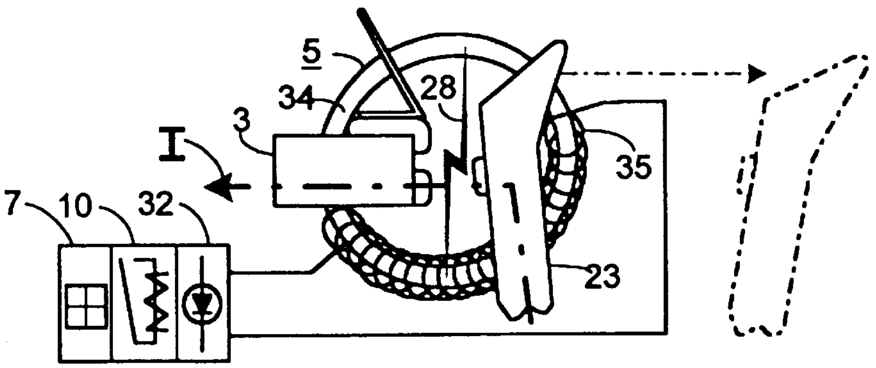
FIG. 6 shows an energy transducer with a toroidal ferrite core in combination with switch contacts of a switching device.

FIGS. 4, 5 and 6 show details on the arrangement and the design of energy transducer 5.

First a low-voltage circuit-breaker is considered with reference to FIG. 4.

The pole of the low-voltage circuit-breaker 6 shown in FIG. 4 comprises an arc quenching chamber 20 with arc splitters 21 and a stationary switch contact 23 plus a movable switch contact 23. An arcing horn 24 on the stationary switch contact 22 and an arc control bus 25 on the opposite end of arc quenching chamber 1 conduct an arc occurring between switch contacts 22 and 23 to arc splitters 21.

Switching mechanism 7 for actuating the movable switch contact 4 is also shown schematically in FIG. 4 as in FIGS. 1 and 3. No further description of switching mechanism 7 is necessary because it may be a conventional switching mechanism such as that described, for example, in German Patent No. 40 22 078 A1. A drive device 26 which is also diagramed here schematically serves to switch movable switch contact 23 to the on condition shown here by hand or by means of an auxiliary power. Switching mechanism 7 can be tripped by a tripping solenoid 10 which can be actuated by an electric or electromechanical tripping element 11 in a known way.

FIG. 4 shows with dash-dot lines two other positions of the movable switch contact 23. One position corresponds to the completely opened position, which occurs after the release of switching mechanism 7. Regardless of this, however, the movable switch contact 23 may assume a position only a slight distance away from the stationary switch contact 22 when a short-circuit current flows over the switch contacts and the contact force is overcome by electrodynamic forces. The resulting arc is sensed by energy transducer 5, which delivers sufficient energy to operate tripping solenoid 11. Energy transducer 5 can be accommodated, for example, in parts of the wall of arc quenching chamber 1 or outside it.

FIG. 5 shows an example of an energy transducer 5 and a respective circuit arrangement. Energy transducer 5 has a casing 27, which is indicated only in general and which accommodates a coil 30. A ferrite rod 31 serves as the core of coil 30, thus creating an arrangement that functions in the manner of an antenna. Electromagnetic radiation 28 emanated by an electric arc at switch contacts 22 and 23 generates in coil 30 a high-frequency alternating current that is converted by a rectifier arrangement 32 to a direct current suitable for operating tripping solenoid 10. This is preferably a magnetic clamp system of the type mentioned above, whose tripping winding requires very little power. Thus the device described here is continuously ready for operation without any auxiliary power.

Low-voltage circuit-breakers are very compact devices in which the individual modules are arranged with very little distance between them. Therefore, it is not difficult to supply the control energy provided by energy transducer 5 to tripping solenoid 10 through a suitable connecting line 33, as indicated with dash-dot lines in FIG. 4. Such a connecting line may be mounted on the outside of arc quenching chamber 20, for example, from which only a short distance is to be bridged to tripping solenoid 10.

As mentioned already, energy transducers with a toroidal ferrite core are especially suitable for the purposes of the present invention. FIG. 6 shows one example of such energy transducers. According to the present invention, energy transducer 5 has a toroidal core 34 of a ferrite material that is provided entirely or partially with a winding 35. Multiple windings may also be provided on core 34. Energy transducer 5 is located at the sides of switch contacts 22 and 23 approximately in such a way that the plane of the torus is approximately parallel to the plane of the switch movement. Rectifier arrangement 32, which is connected to winding 35, as well as tripping solenoid 10 and switching mechanism 7 are indicated schematically.

What is claimed is:

1. A protection device for protecting against an overload of switch contacts of a switching device, the switching device including a switching mechanism for opening and closing the switch contacts, wherein the switch contacts being separable in response to a high current corresponding to an action of the switching mechanism thereby forming an electric arc, the protection device comprising:

an energy transducer positioned near the switch contacts, wherein the energy transducer is exposed to an electromagnetic radiation associated with the electric arc, and wherein the energy transducer converts the received electromagnetic radiation into a current for operating the protection device.

2. The protection device according to claim 1, wherein the energy transducer includes a coil, and wherein the coil is wound about a ferrite core and is coupled to a rectifier circuit.

3. The protection device according to claim 2, wherein the ferrite core is toroidal.

4. The protection device according to claim 1, wherein the switching device includes an isolating switch, and wherein the protection device is assigned to a protective device connected in series with the isolating switch and wherein the protective device is controlled by a current supplied by the energy transducer.

5. The protection device according to claim 1, wherein the switching device includes a contactor and an electromagnetic drive and wherein the protection device is assigned to a control circuit of the contactor.

6. The protection device according to claim 5, wherein the contactor is an unlatched contactor, and wherein a normally closed contact arranged in the control circuit of the electromagnetic drive is operated by the energy transducer.

7. The protection device according to claim 5, wherein the contactor is a latched contactor including a release magnet and wherein the energy transducer is electrically connected to the release magnet.

8. The protection device according to claim 1, wherein the switching device includes a power circuit-breaker, the protection device includes a tripping solenoid for the switching mechanism, and the energy transducer is electrically connected to the tripping solenoid.

9. The protection device according to claim 8, wherein the tripping solenoid includes a permanent magnet for maintaining a loaded position of an energy storage device and a second tripping solenoid for releasing the energy storage device.

* * * * *